May 13, 1924.　　　　W. G. TWYMAN　　　　1,494,042
MOLD FOR GLASS CYLINDERS
Filed June 8, 1923　　　3 Sheets-Sheet 3

Witnesses:

Inventor
W. G. Twyman
By
Attorney

Patented May 13, 1924.

1,494,042

UNITED STATES PATENT OFFICE.

WILLIAM G. TWYMAN, OF CANEY, KANSAS.

MOLD FOR GLASS CYLINDERS.

Application filed June 8, 1923. Serial No. 644,070.

*To all whom it may concern:*

Be it known that I, WILLIAM G. TWYMAN, a citizen of the United States, residing at Caney, in the county of Montgomery and State of Kansas, have invented certain new and useful Improvements in Molds for Glass Cylinders, of which the following is a specification.

In carrying out the present invention, it is my purpose to provide a mold for use in the art of glass cylinder blowing that is extremely simple of construction, and highly efficient in operation, whereby glass cylinders may be blown of the same diameter that is otherwise impossible, without a mold of the present type.

A further purpose of the invention is the provision of such a mold that comprises a pair of semi-circular half sections hingedly joined together, one of said half sections adapted to be opened and closed in a novel, simple and expeditious manner for permitting of the positioning of the lump of semi-molten glass therein as well as for permitting of the easy removal of the blown cylinder therefrom.

The nature and advantages of the invention will be better understood when the following detailed description is read in connection with the accompanying drawings, the invention residing in the construction, combination, and arrangement of parts as claimed.

In the drawings forming a part of this application, like numerals of reference indicate similar parts in the several views, and wherein.

Figure 1:
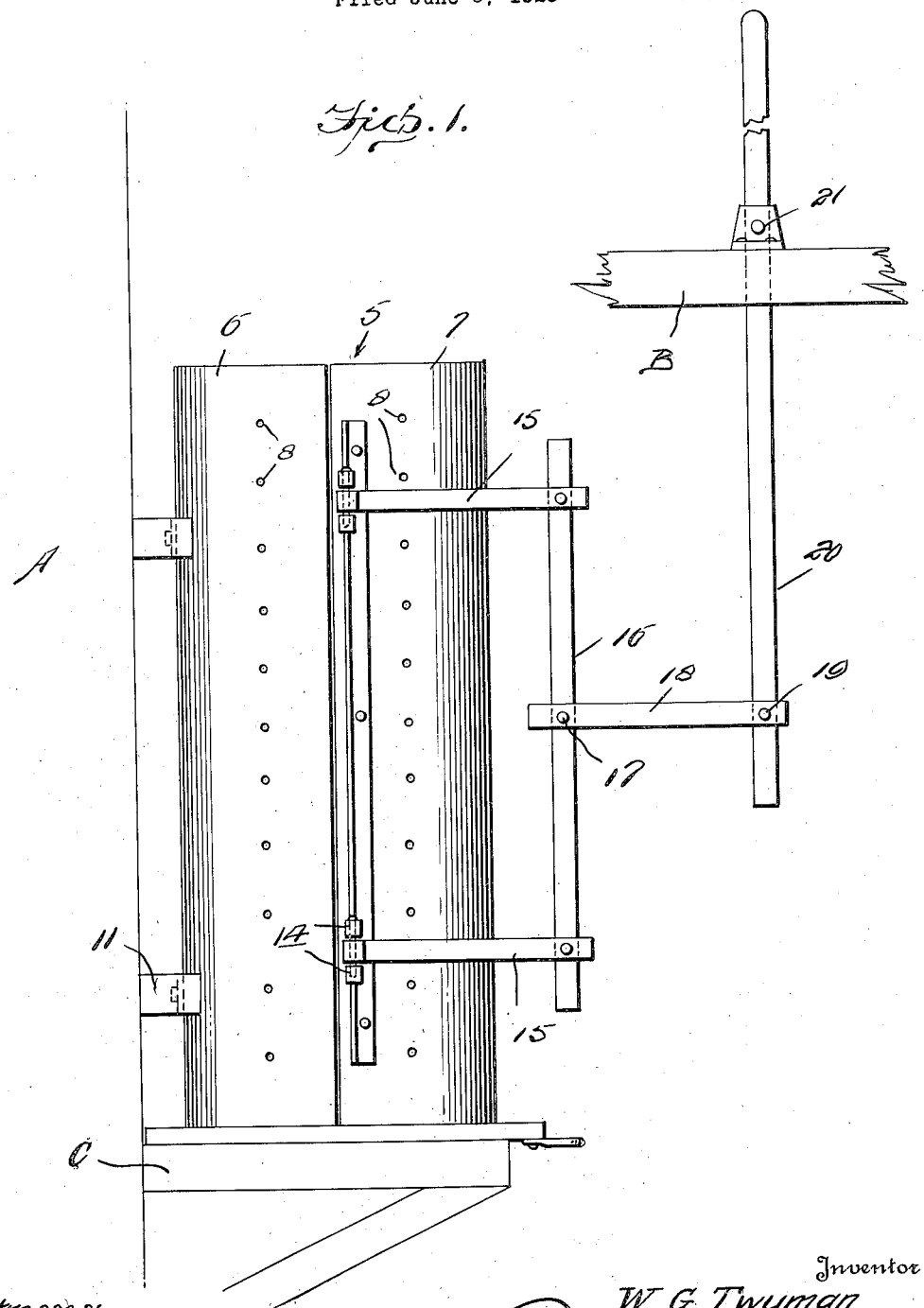
Figure 1 is a front elevation of my improved mold, together with its opening and closing mechanism.
Figure 2:
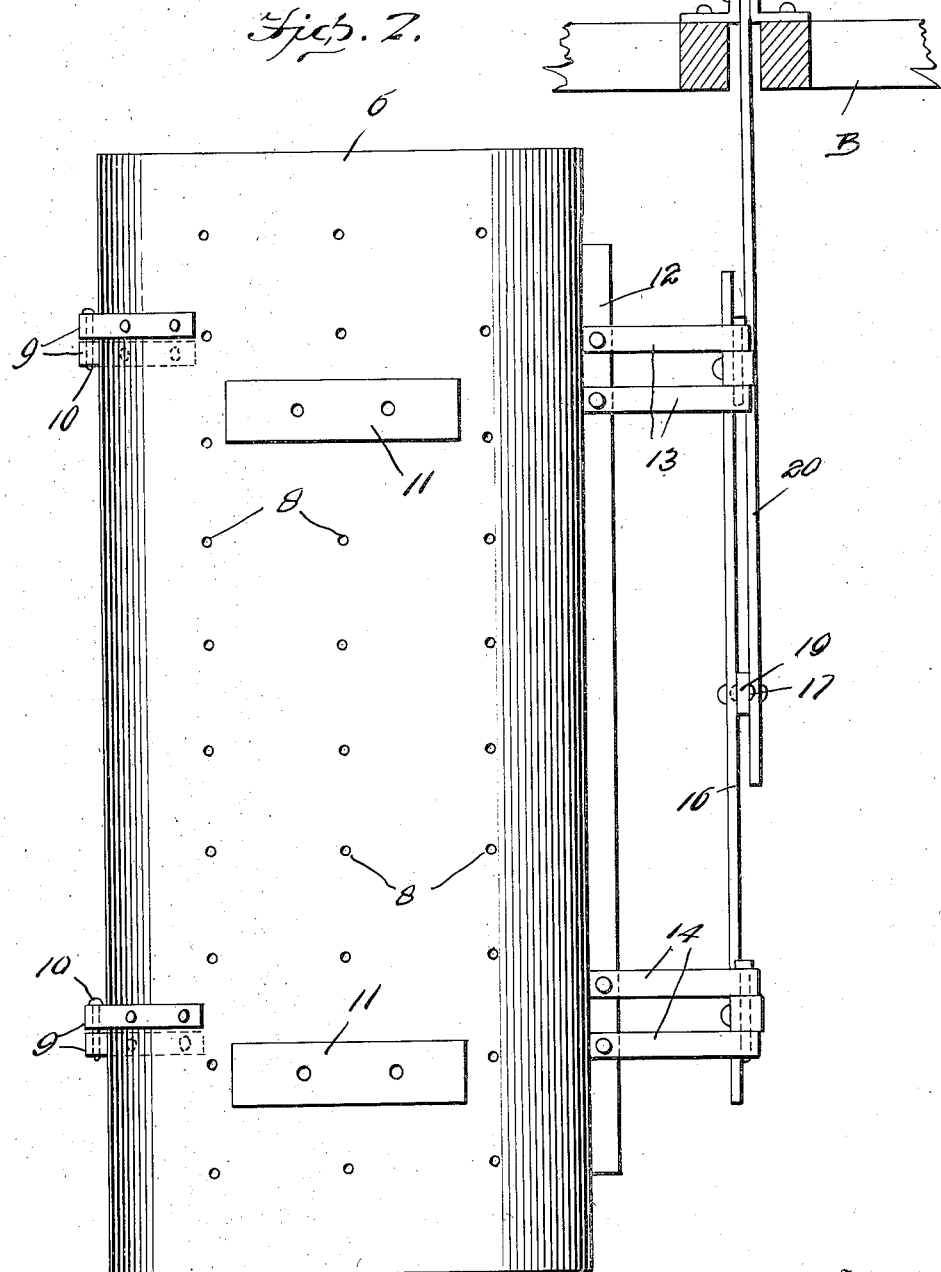
Figure 2 is an enlarged elevation of one side of the mold, together with its opening and closing mechanism, a portion of said mechanism being broken away.
Figure 3:
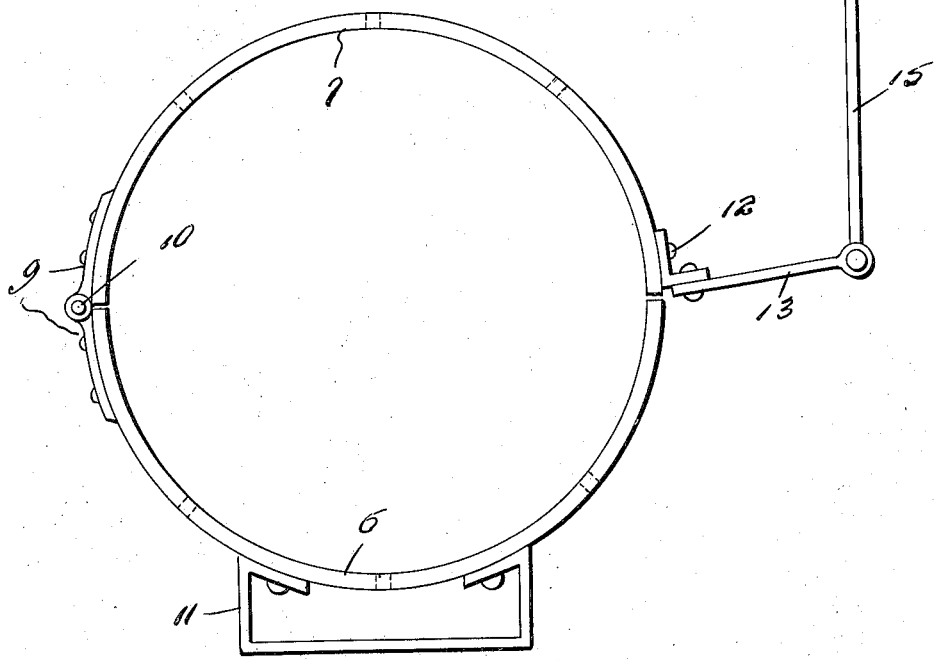
Figure 3 is a top plan view thereof.
Figure 4:
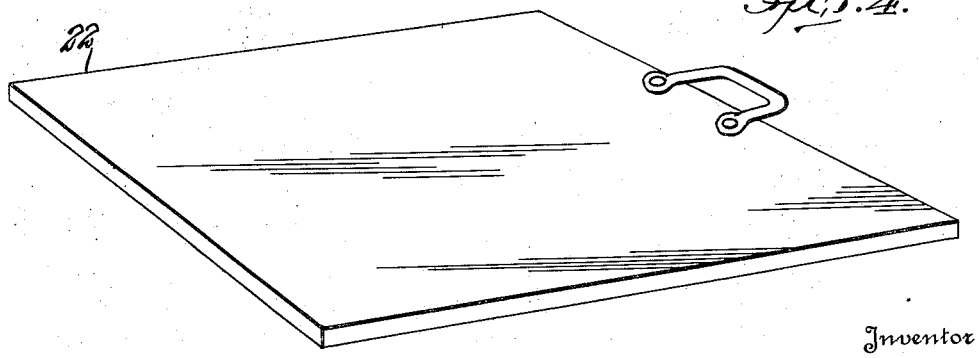
Figure 4 is a perspective of a removable plate element, that is employed in conjunction with my improved mold.

Referring to the drawings in detail, my improved mold, designated generally 5 includes a pair of relatively elongated semi-circular half sections 6 and 7, respectively. The sections of this mold are made of sheet material and are perforated at 8 for allowing the air to escape therefrom as the glass cylinder is being blown out to the wall of the mold by the blower. The said mold sections 6 and 7 are hingedly joined together, through the medium of metal strips 9 that are pivoted to each other at 10 and carried by the mold section 6 are bracket elements 11, whereby the mold may be secured to a wall A, or other appropriate support. Secured to the free edge of the mold section 7, and extending parallel therewith is an L-shaped bar 12, and carried by said L-bar adjacent the upper and lower ends thereof and projecting outwardly therefrom is an upper and lower pair of arms 13 and 14, respectively. Pivotally secured between said pair of arms are the inner ends of arms 15 that extend parallel with each other, and are in turn, rigidly secured at their opposite ends to a vertical bar 16. Pivotally secured at 17 to a point substantially intermediate the ends of said bar 16 is one end of a connecting link 18, the other end of this connecting link being pivotally joined at 19 to a rocking lever 20, at a point adjacent its lower end. This rocking lever 20 is in turn, pivotally connected at 21 to a suitable support B, and in view of this description, it will at once be apparent that when the bar 20 is rocked upon its pivot 21 in opposite directions, the mold section 7 will be opened and closed with respect to the section 6, for allowing the insertion of the lump of molten glass into the mold, as well as a removal of the block cylinder.

The mold 5 is positioned upon the wall A or other support at a point slightly above a platform C, and in operation, the interior of the mold is pasted for allowing the glass cylinder to be rotated therein as the cylinder is being blown, thereby permitting the operator to make each and every glass cylinder the same diameter which would otherwise be impossible without a mold. Before the lump of glass is placed within the mold, a substantially square shaped metal plate 22 is positioned upon said support C beneath the lower end of the mold, which plate is also to be pasted for consequently preventing the glass from running out of the lower end of the mold. After the cylinder has been blown, the section 7 is swung open by the rocking lever 20 and the cylinder removed.

In view of the above description, it will at once be apparent that I have provided a highly useful form of mold for use in the art of glass cylinder blowing, and even though I have herein set forth the most practical embodiment of my invention with which I am familiar, it is nevertheless to be understood that minor changes may be made therein, without departing from the spirit and scope of the invention as claimed.

Having thus described my invention, what I claim as new, and desire to secure by Letters-Patent, is:

A mold of the class described, a pair of semi-cylindrical half sections hingedly joined together, means for opening and closing one of said half sections with respect to the other, means for anchoring the other of said half sections to a support, a platform spaced beneath said mold and a removable plate adapted to be positioned between said mold and said platform.

In testimony whereof I affix my signature.

WILLIAM G. TWYMAN.